(12) United States Patent
Powell et al.

(10) Patent No.: US 11,696,046 B2
(45) Date of Patent: *Jul. 4, 2023

(54) HIGH-RESOLUTION IMAGE CAPTURE BY LUMINANCE-DRIVEN UPSAMPLING OF PIXEL-BINNED IMAGE SENSOR ARRAY OUTPUT

(71) Applicant: Shenzhen Goodix Technology Co., Ltd., Shenzhen (CN)

(72) Inventors: Matthew Powell, San Diego, CA (US); Jinwen Xiao, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,987

(22) Filed: Jan. 24, 2022

(65) Prior Publication Data
US 2023/0027452 A1 Jan. 26, 2023

Related U.S. Application Data

(60) Provisional application No. 63/225,524, filed on Jul. 25, 2021.

(51) Int. Cl.
H04N 25/46 (2023.01)
H04N 25/75 (2023.01)
(Continued)

(52) U.S. Cl.
CPC ........... *H04N 25/50* (2023.01); *G06T 3/4007* (2013.01); *G06T 3/4038* (2013.01); *H04N 9/646* (2013.01);
(Continued)

(58) Field of Classification Search
CPC ........ H04N 5/347; H04N 5/353; H04N 5/378; H04N 9/04515; H04N 9/0455;
(Continued)

(56) References Cited

U.S. PATENT DOCUMENTS 8,624,997 B2 1/2014 Kuang
11,470,270 B1 * 10/2022 Powell ............... H04N 9/04515
(Continued)

*Primary Examiner* — Nelson D. Hernández Hernández
(74) *Attorney, Agent, or Firm* — Kilpatrick Townsend & Stockton LLP

(57) ABSTRACT

Techniques are described for efficient high-resolution output of an image captured using a high-pixel-count image sensor based on pixel binning followed by luminance-guided umsampling. For example, an image sensor array is configured according to a red-green-blue-luminance (RGBL) CFA pattern, such that at least 50-percent of the imaging pixels of the array are luminance (L) pixels. Pixel binning is used during readout of the array to concurrently generate a downsampled RGB capture frame and a downsampled L capture frame. Following the readout, the L capture frame is upsampled (e.g., by upscaling and interpolation) to generate an L guide frame with 100-percent luminance density. An upsampled RGB frame can then be generated by interpolating the RGB capture frame based both on known neighboring RGB information (e.g., from the RGB capture frame and previously interpolated information), as adjusted based on local luminance information from the L guide frame.

20 Claims, 10 Drawing Sheets

(51) Int. Cl.
*H04N 25/13* (2023.01)
*H04N 25/50* (2023.01)
*G06T 3/40* (2006.01)
*H04N 9/77* (2006.01)
*H04N 23/84* (2023.01)
*H04N 25/42* (2023.01)
*H04N 25/11* (2023.01)
*H04N 25/53* (2023.01)
*H04N 9/64* (2023.01)

(52) U.S. Cl.
CPC ............... *H04N 9/77* (2013.01); *H04N 23/84* (2023.01); *H04N 23/843* (2023.01); *H04N 25/11* (2023.01); *H04N 25/135* (2023.01); *H04N 25/42* (2023.01); *H04N 25/46* (2023.01); *H04N 25/53* (2023.01); *H04N 25/75* (2023.01)

(58) Field of Classification Search
CPC .......... H04N 9/646; H04N 9/77; H04N 25/11; H04N 25/135; H04N 25/50; H04N 25/42; H04N 25/46; H04N 25/53; H04N 25/75; H04N 25/133; H04N 23/843; G06T 3/4007

See application file for complete search history.

(56) References Cited

U.S. PATENT DOCUMENTS

| | | | |
|---|---|---|---|
| 2010/0253833 A1* | 10/2010 | Deever | ................ H04N 25/589 348/E5.034 |
| 2015/0138407 A1 | 5/2015 | Kawaguchi et al. | |
| 2015/0281608 A1 | 10/2015 | Miyahara | |
| 2018/0357750 A1 | 12/2018 | Chen et al. | |
| 2020/0295096 A1 | 9/2020 | Min | |
| 2021/0120214 A1 | 4/2021 | Byun et al. | |
| 2021/0217134 A1 | 7/2021 | Okamura | |
| 2021/0377497 A1 | 12/2021 | Bernstein et al. | |
| 2021/0390747 A1 | 12/2021 | Feng et al. | |

* cited by examiner

HIGH-RESOLUTION IMAGE CAPTURE BY LUMINANCE-DRIVEN UPSAMPLING OF PIXEL-BINNED IMAGE SENSOR ARRAY OUTPUT

CROSS-REFERENCES

This application is a non-provisional of, and claims priority to, U.S. Provisional Patent Application No. 63/225,524, filed on Jul. 25, 2021, titled "PIXEL BINNING FOLLOWED BY UPSAMPLING WITH RGBW CFA," which is hereby incorporated by reference in its entirety.

TECHNICAL FIELD

Embodiments described herein relate to image sensor devices, and more particularly, to high-resolution image capture by luminance-driven upsampling of pixel-binned image sensor array output in image sensors having red-green-blue-luminance (RGBL) color filter arrays (CFAs).

BACKGROUND

Modern image sensors with high pixel count attempt to achieve high frame rate, low read noise and high dynamic range with minimal power consumption. The basic function of a modern CMOS image sensor (CIS) is to capture photons that are converted into electrons in a photodiode. These captured electrons are read out by a series of ADCs included as part of the sensor. In the read out chain, higher power can provide lower read noise or higher dynamic range, which result in improved image quality. But higher power consumption also results in shorter battery lifetimes and thermal heating, which has intrinsic limits in consumer products and can lead to worse sensor performance in the context of CIS.

For example, a high-resolution image sensor may have tens of millions of photo-sensor pixels, and reading out each individual pixel in every image capture frame may consume excessive amounts of time and power. Pixels can be binned together for readout in various ways to reduce the effective number of pixel outputs to read out, thereby providing more efficient readout of the pixel array in each frame. However, such an approach also decreases the resolution of the output image, thereby irretrievably losing captured image data. Achieving the benefit of faster readout and lower noise while maintaining sensor resolution is a challenge.

BRIEF SUMMARY OF THE INVENTION

Embodiments provide novel technical approaches for efficient high-resolution output of an image captured using a high-pixel-count image sensor based on pixel binning followed by luminance-guided upsampling. For example, an image sensor array is configured according to a red-green-blue-luminance (RGBL) CFA pattern, such that at least 50-percent of the imaging pixels of the array are luminance (L) pixels. Pixel binning is used during readout of the array to concurrently generate a downsampled RGB capture frame and a downsampled L capture frame. Following the readout, the L capture frame is upsampled (e.g., by upscaling and interpolation) to generate an L guide frame with 100-percent luminance density. An upsampled RGB frame can then be generated by interpolating the RGB capture frame based both on known neighboring RGB information (e.g., from the RGB capture frame and previously interpolated information), as adjusted based on local luminance information from the L guide frame.

In one set of embodiments, a method is provided for high-resolution image capture using an image sensor system. The method includes: obtaining a plurality of photo-sensor output levels, each corresponding to an amount of photocharge accumulated by a respective one of a plurality of photo-sensors of an image sensor array responsive to exposing the image sensor array to incident illumination during an integration window, each of the plurality of photo-sensors optically coupled with a respective color filter of a color filter array (CFA) in accordance with a red-green-blue-luminance (RGBL) CFA pattern; reading out the plurality of photo-sensor output levels using pixel binning, in a readout window subsequent to the integration window, to generate a downsampled RGB capture frame and a downsampled L capture frame; and generating a luminance-enhanced output image, in an upsampling time window following the readout time window, by upsampling the L capture frame to generate an L guide frame, and applying luminance-guided interpolation to the RGB capture frame based on the L guide frame to upsample the RGB capture frame. In some embodiments, the method further includes outputting the luminance enhanced output image to a processor-controlled system separate from the image sensor system.

In another set of embodiments, an image sensor is provided. The image sensor includes a photo-sensor array, binning readout circuitry, and an upsampling engine. The photo-sensor array includes a plurality of photo-sensors, each photo-sensor optically coupled with a respective color filter of a color filter array (CFA) in accordance with a red-green-blue-luminance (RGBL) CFA pattern, the plurality of photo-sensors configured to generate a plurality of photo-sensor output levels corresponding to an amount of photocharge accumulated responsive to exposure to incident illumination during an integration window. The binning readout circuitry is coupled with the photo-sensor array to read out the plurality of photo-sensor output levels using pixel binning, in a readout window subsequent to the integration window, to generate a downsampled RGB capture frame and a downsampled L capture frame. The upsampling engine is coupled with the binning readout circuitry to generate a luminance-enhanced output image, in an upsampling time window following the readout time window, by upsampling the L capture frame to generate an L guide frame, and applying luminance-guided interpolation to the RGB capture frame based on the L guide frame to upsample the RGB capture frame. In some embodiments, the image sensor further includes a sensor controller coupled with at least the binning readout circuitry and the upsampling engine. The sensor controller is to generate and output first control signals to direct the binning readout circuitry to read out the plurality of photo-sensor output levels using the pixel binning, and the sensor controller is to generate and output second control signals to direct the upsampling engine to generate the luminance-enhanced output image.

Additional features and advantages will be apparent to those skilled in the art upon reading the following detailed description and the accompanying drawings.

BRIEF DESCRIPTION OF THE DRAWINGS

The accompanying drawings form a part of the present disclosure that describe exemplary embodiments of the present invention. The drawings together with the specification will explain the principles of the invention.

FIGS. 2A-2D show examples of such non-Bayer red-green-blue-luminance (RGBL) color filter arrays (CFAs), according to various embodiments described herein.

Figure 1:
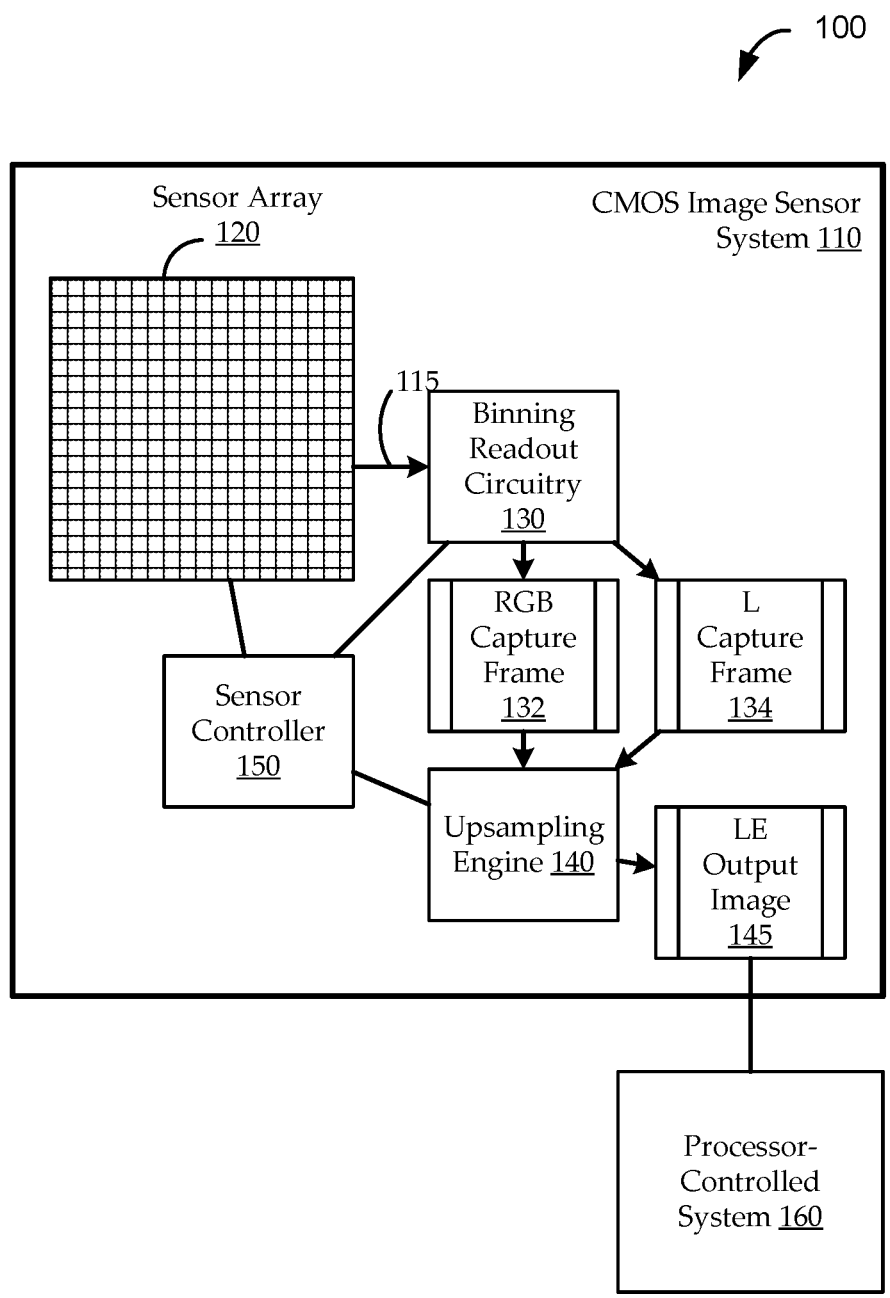
FIG. 1 shows a block diagram is shown of an imaging sensor environment as context for various embodiments described herein.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Electronic devices that include high-performance image sensors have become ubiquitous, and consumers are demanding ever-increasing resolutions for those image sensors. While such image sensor designs continue to drive toward high pixel counts and image resolutions, implementation of such features typically competes with other desired design features and constraints, such as high frame rates, low read noise, high dynamic range, minimal power consumption, etc. For example, high-resolution image sensors can be manufactured with tens of millions of photo-sensor pixels. However, reading out each of those tens of millions of individual pixel values in every image capture frame may consume excessive amounts of time (e.g., resulting in low frame rate), may consume excessive power (e.g., resulting in reduced battery life and/or excessive device heating), and/or may be otherwise impractical in many consumer device environments.

Some high-performance sensors address such concerns by using conventional pixel binning techniques to combine together adjacent photo-sensor outputs for readout, thereby effectively reducing the amount of data being read out of the sensor array. While such an approach can yield more efficient readout (e.g., faster, lower power, etc.), such an approach also decreases the resolution of the output image. In theory, advanced image processing algorithms can be used to scale up the resolution of a reduced-resolution image. Conventional techniques tend to rely heavily on computationally intensive neural nets, or similar types of algorithmic structures. At least because these techniques tend to take more time to perform resolution up-scaling than it generally takes the image sensor to generate an image, the techniques are typically performed 'offline' (i.e., separate from the image sensor path and subsequent to image capture and output by the image sensor). For example, if a mobile phone can use these types of techniques to generate an up-scaled image of a single image frame in a few seconds or even longer, such a capability may be useful for high-quality photography applications, or to apply digital zoom or image resolution enhancements to images that were previously captured and output from the image sensor (i.e., as a post-editing feature, or the like). However, these types of techniques tend to be impractical or infeasible for real-time applications, such as real-time up-scaling of images or videos (as they are being captured and produced), real-time upscaling of image preview modes, etc. Even if a computational engine could be implemented to support such real-time up-scaling using conventional techniques, such a device would likely consume more power and/or other resources than simply generating the higher resolution image natively in the image sensor itself.

Embodiments described herein provide novel techniques for leveraging properties of red-green-blue-luminance (RGBL) color filter array (CFA) pattern to efficiently generate enhanced resolution images from high-pixel-count image sensors by applying multi-frame pixel binning during readout followed by luminance-driven upsampling in the image sensor processing path. The RGBL CFA pattern includes at least 50-percent luminance density, as described herein. During readout, multi-frame pixel binning is used to concurrently generate an RGB capture frame and an L capture frame. The RGB capture frame is upsampled based on the L capture frame to generate an enhanced resolution output image (e.g., having the full native resolution of the image sensor). The L color plane includes intensity information that relates to a broad range of the (e.g., the entire) RGB color spectrum. As such, upsampling based on the L capture frame can yield improved recovery of captured photo-sensor information lost during the pixel binning, and correspondingly high quality sub-pixel interpolation, without the high computational intensity of conventional approaches.

Turning to FIG. 1, a block diagram is shown of an imaging sensor environment 100 as context for various embodiments described herein. The imaging sensor environment 100 is illustrated as including a complementary metal-oxide semiconductor (CMOS) imaging sensor (CIS) system 110 in communication with a processor-controlled system 160. The imaging sensor environment 100 may be used to implement a digital imaging system in any suitable application context. For example, the CIS system 110 and processor-controlled system 160 can be implemented in a smartphone, digital camera, wearable device, implantable device, laptop computer, tablet computer, electronic reader, Internet of things (IoT) appliance, or any other suitable context. The processor-controlled system 160 is intended generally to represent any suitable system or systems to provide any suitable features of the imaging sensor environment 100, other than those of the CIS system 110. For example, in a smart phone, the processor-controlled system 160 can include subsystems for providing telephonic and communications features, display features, user interaction features, application processing features, etc.

As illustrated, the CIS system 110 includes a sensor array 120, binning readout circuitry 130, and an upsampling engine 140. Timing, signaling, and/or other features of components of the CIS system 110 are controlled by a sensor controller 150. The sensor controller 150 can include any suitable processors and/or circuits for directing operation of the CIS system 110 components and interfacing with other systems (e.g., processor-controlled system 160). Some implementations of the sensor control circuit 150 are implemented as, or include a companion integrated circuit (IC) having integrated interface components, storage components, and processing components. For example, the processing components of the sensor control circuit 150 can include one or more central processing units (CPUs), application-specific integrated circuits (ASICs), application-specific instruction-set processors (ASIPs), graphics processing units (GPUs), physics processing units (PPUs), digital signal processors (DSPs), field-programmable gate array (FPGAs), programmable logic devices (PLDs), controllers, microcontroller units, reduced instruction set computer (RISC) processors, complex instruction set computer (CISC) processors, microprocessors, or the like, or any combination thereof.

A basic function of the sensor array 120 is to capture photons and convert them into electrons using photo-sensors. Thus, the sensor array 120 is implemented as an array of any suitable photo-sensors. For example, each photo-sensor can be implemented as a single photodiode, or as a set of photodiodes (e.g., multiple photodiodes sharing a common floating diffusion node). In some cases, the sensor array 120 is a high-pixel-count array, such as a 48 Megapixel array. Each photo-sensor in the sensor array 120 generates a sensor output level responsive to exposure to incident illumination. For example, while the sensor array 120 is exposed to light during an integration time window, the photo-sensors accumulate an amount of photocharge that corresponds to an intensity of illumination it receives. At the end of the integration time window, the amount of photocharge accumulated by the photo-sensor manifests as the photo-sensor's sensor output level.

Each photo-sensor in the sensor array 120 is optically integrated with optics, including a respective color filter that is permissive to light energy in one or more frequency bands. For example, a photo-sensor integrated with a "red" color filter will receive light in the red color band permitted by the color filter, such that the sensor output level generated by that photo-sensor will indicate a received intensity of red light at the corresponding location in the sensor array 120. The array of color filters optically integrated with the array of photo-sensors is arranged according to a pattern, referred to as a color filter array (CFA) pattern, or simply as a CFA. Terms, like "imaging pixel," or "image sensor pixel," are used herein to refer to a particular imaging location in the sensor array 120, which corresponds to light received by a corresponding photo-sensor via a corresponding color filter.

Many conventional CFAs implement patterns of red (R), green (G), and blue (B) color filters, where each filter color can be considered as a color plane with reduced density. For example, a typical Bayer RGB CFA can be arranged with 50% G imaging pixels, 25% B imaging pixels, and 25% R imaging pixels. Some conventional CFAs have sought to adapt the CFA for increased luminance response. For example, it has been found that yellow (Y) imaging pixels, or white (W) imaging pixels tend to provide increased luminance information. As such, some conventional designs sought to modify Bayer patterns by replacing G imaging pixels with higher-luminance Y or W imaging pixels (e.g., to form a RYYB CFA, or a RWWB CFA). However, such designs have tended to be unsuccessful at least because the large difference in luminance between adjacent imaging pixels for any particular light condition tended to yield poor response characteristics (e.g., signal-to-noise ratio, pixel conversion gain, etc.) across the array.

Embodiments described herein use non-Bayer color patterns that include various densities of luminance (L) imaging pixels in addition to RGB imaging pixels. Such CFAs are referred to herein as RGBL CFAs. In some implementations, the L imaging pixels (of any of the different RGBL CFAs described herein) are implemented as W imaging pixels, such that the CFAs follow an RGBW pattern. The luminance pixels can be used primarily to capture broad-spectrum luminance (e.g., light intensity) information, rather than particular color information.

Figures 2A, 2B, 2C, 2D:
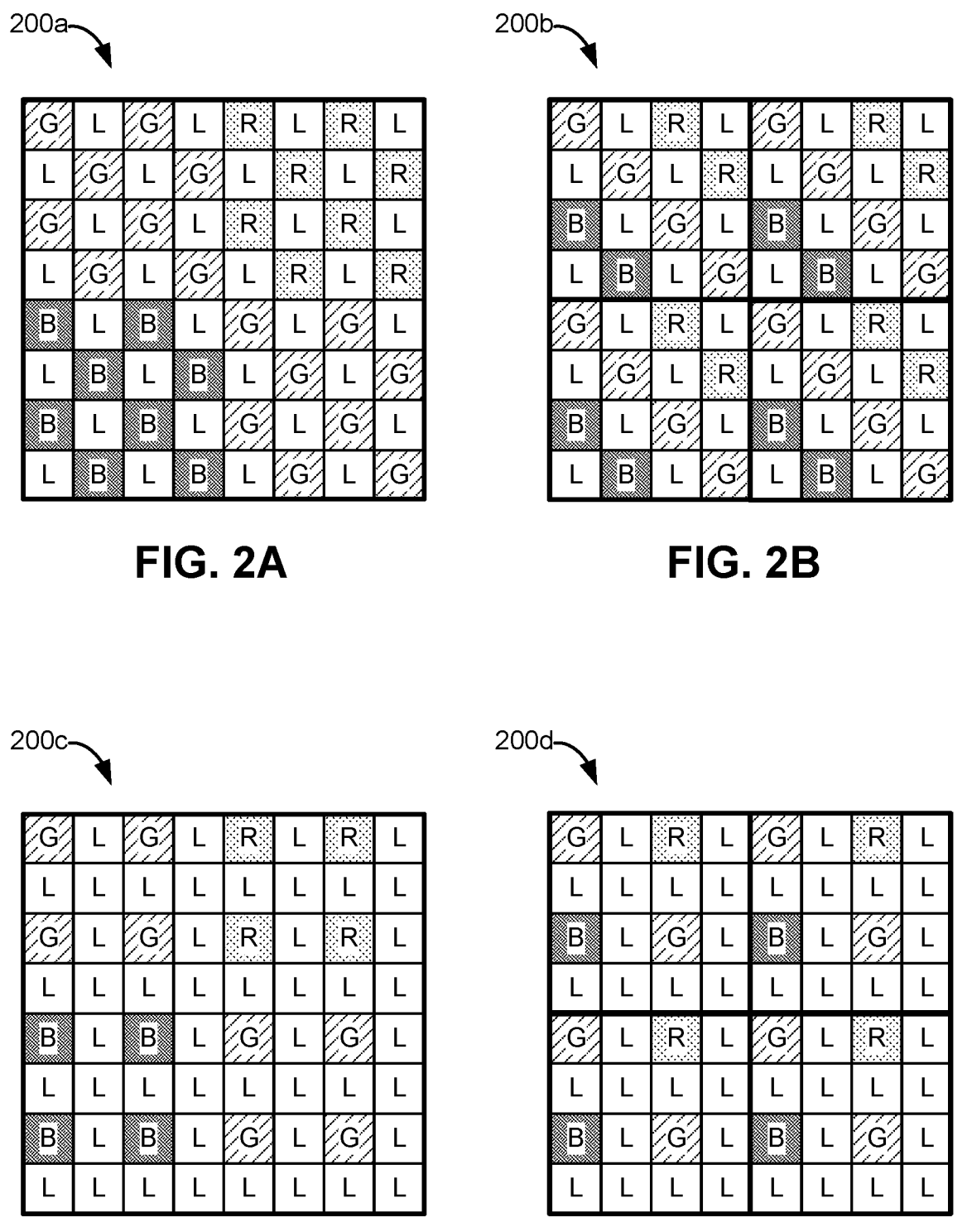

FIGS. 2A-2D show examples of such non-Bayer RGBL CFAs 200, according to various embodiments described herein. FIG. 2A shows a first RGBL CFA implemented as so-called "hexa-deca RGBL" CFA. Such a CFA includes repeating 8-by-8 subarrays of imaging pixels, each with an equal distribution of L imaging pixels and RGB imaging pixels. In particular, each subarray (of 64 imaging pixels) includes 32 RGB imaging pixels (16 G imaging pixels, 8 R imaging pixels, and 8 B imaging pixels), with 32 L imaging pixels evenly interspersed in a checkerboard pattern. FIG. 2B shows a second RGBL CFA implemented as so-called "Quad RGBL" CFA. Such a CFA includes repeating 4-by-4 subarrays of imaging pixels, each also having an equal distribution of L imaging pixels and RGB imaging pixels. In particular, each subarray (of 16 imaging pixels) includes 8 RGB imaging pixels (4 G imaging pixels, 2 R imaging pixels, and 2 B imaging pixels), with 8 L imaging pixels evenly interspersed in a checkerboard pattern. It can be seen that in both the hexa-deca RGBL CFA of FIG. 2A and the Quad RGBL CFA of FIG. 2B, half of all the pixels in each subarray are L imaging pixels. Such a distribution is referred to herein as having 50-percent luminance density (or L density).

FIGS. 2C and 2D show RGBL CFAs with 75-percent luminance density. FIG. 2C shows a third RGBL CFA implemented as so-called "sparse hexa-deca RGBL" CFA. Such a CFA is similar to the hexa-deca RGBL CFA of FIG. 2A, except that every other row is only L imaging pixels. As such, each subarray (i.e., each 8-by-8 subarray of 64 imaging pixels) includes 48 L imaging pixels interspersed with 16 RGB imaging pixels (8 G imaging pixels, 4 R imaging pixels, and 4 B imaging pixels). FIG. 2D shows a fourth RGBL CFA implemented as so-called "sparse Quad RGBL" CFA. Such a CFA is similar to the Quad RGBL CFA of FIG. 2B, except that every other row is only L imaging pixels. As such, each subarray (i.e., each 4-by-4 subarray of 16 imaging pixels) includes 12 L imaging pixels interspersed with 4 RGB imaging pixels (2 G imaging pixels, 1 R imaging pixel, and 1 B imaging pixel). The sparse hexa-deca RGBL CFA of FIG. 2C and the sparse Quad RGBL CFA of FIG. 2D are referred to as 75-percent luminance density CFAs herein because three-quarters of the imaging pixels in each of their respective subarrays are L imaging pixels.

Though embodiments are described herein with reference to specific CFA patterns, novel techniques described herein can be applied to any suitable type of CFA pattern that interleaves a sufficiently high density of L imaging pixels with color imaging pixels. For example, specific references herein to red, green, and blue color planes are intended only to exemplify a set of possible implementations; and some or all of those color planes can be replaced by other color planes to be interleaved with the L imaging pixels. As one example, embodiments described herein can be applied to CFA patterns that interleave cyan, magenta, and/or yellow color planes with a high density of L imaging pixels.

Returning to FIG. 1, the CIS system 110 can be used to produce an image (e.g. a single image, one of a burst of sequential images, a frame of a video, etc.) in an imaging time window. For example, each imaging time window can include at least an integration time window, a readout time window, and an upsampling time window. During the integration time window, the sensor array 120 is exposed to incident illumination (e.g., and during which shutters, focusing optics, and/or other components are controlled to facilitate such exposure). In response to such exposure, each imaging pixel accumulates photocharge in an amount relative to the respective intensity of illumination received by the corresponding photo-sensor of the imaging pixel via the respective color filter of the imaging pixel. The respective amount of accumulated photocharge for each imaging pixel manifests as respective sensor output level.

As noted above, reading out every individual sensor output level at full resolution, particularly for a high-pixel-count sensor array 120, can consume an excessive amount of power, time, and/or other resources. As such, it can be desirable to downsample the sensor array 120 output during readout. Embodiments of the sensor controller 150 direct the binning readout circuitry 130 to readout the respective sensor output levels with pixel binning. The pixel binning can be performed in any suitable manner that: (a) combines the respective sensor output levels from adjacent imaging pixels of a same color to produce a reduced number of binned sensor output levels; and (b) results in a separate downsampled RGB capture frame 132 and downsampled L capture frame 134 for each sensor array 120 readout widow. In some implementations, groups of imaging pixels are coupled with a same floating diffusion node to be read out via a same source follower path. Such implementations can be referred to as "charge binning" and can result in an additive combination of adjacent same-color sensor output levels. In other implementations, each imaging pixel is coupled with a respective floating diffusion node and source follower path, and the source follower paths drive a common readout line to result in an averaging combination of adjacent same-color sensor output levels.

Figure 3:
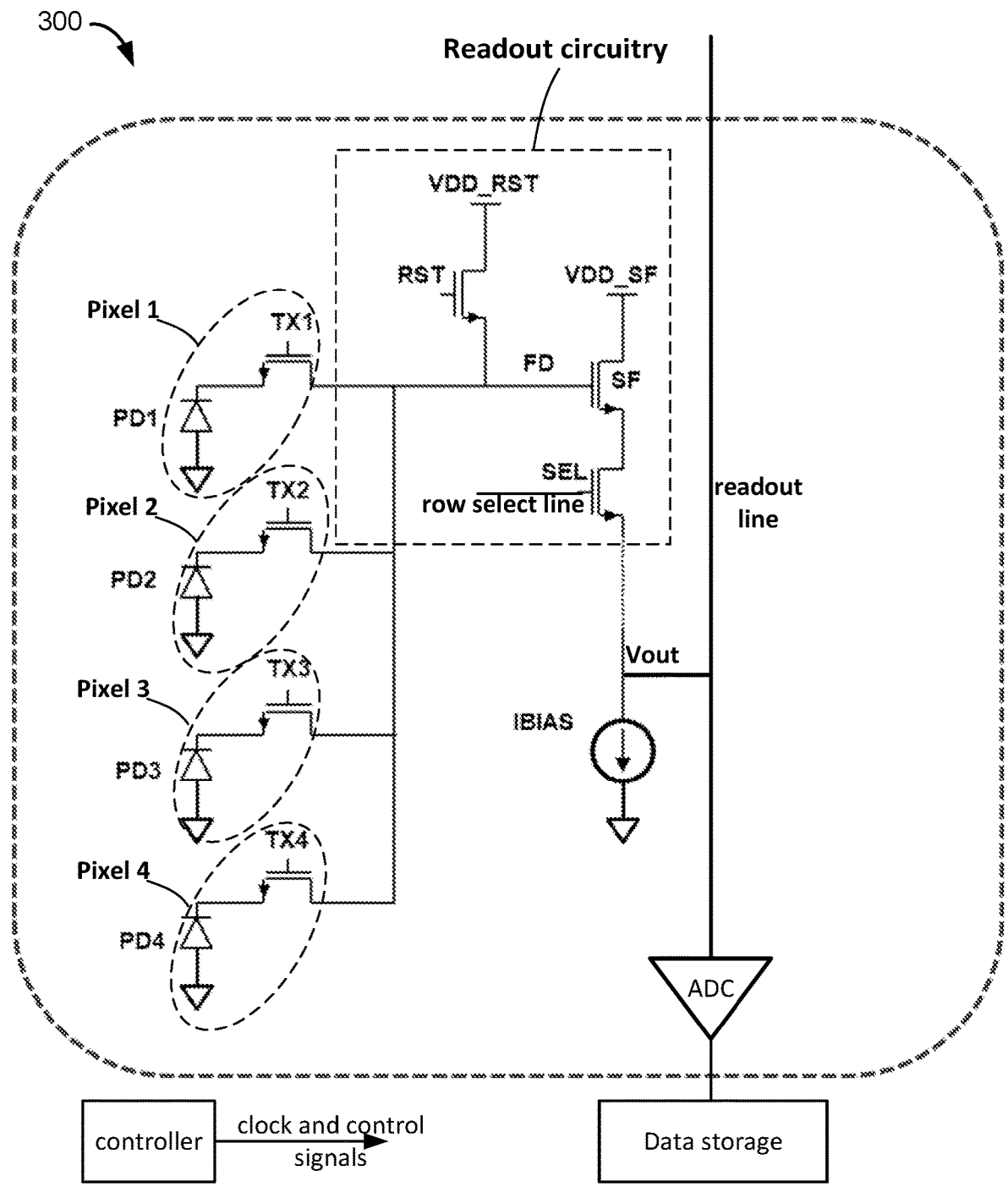
FIG. 3 shows an example circuit that includes a set of imaging pixels and illustrative readout circuit configured to perform charge binning of the outputs of the imaging pixels.

For example, FIG. 3 shows an example circuit 300 that includes a set of imaging pixels and illustrative readout circuit configured to perform charge binning of the outputs of the imaging pixels. The illustrated readout circuitry can be an implementation of the binning readout circuitry 130 of FIG. 1. As illustrated, the readout circuitry can include at least one reset (RST) device, source follower (SF) device, and select (SEL) device. The pixel charge binning concept is to provide the electron charge from all the photodiodes at one time on a shared floating diffusion node, labeled "FD." In this case, the summation of all the shared imaging pixels can be read out with one analog-to-digital (ADC) operation. This can reduce the total energy to read out the entire array and can reduce the circuit noise applied to the shared pixel cluster, at the expense of reduced resolution. In the illustrated circuit, four imaging pixels are shown as "Pixel 1" through "Pixel 4." Each imaging pixel is illustrated as having a respective a photodiode (PD) coupled with the shared FD node via a respective transfer gate (TX).

Prior to the integration time window, the RST device can be turned on to effectively reset the FD node (e.g., to ground). The photodiodes can also be reset by turning ON the transfer gates while turning on the RST device. During the integration time window, the transfer gates are OFF, and the photodiodes accumulate photocharge. Upon completion of the integration time window, the accumulated photocharge can be read out. For example, in a readout time window, turning ON any of the transfer gates can cause the accumulated photocharge of the corresponding photodiode to transfer onto the FD node. Similarly, concurrently turning on all of the transfer gates can cause the accumulated photocharge of all of the photodiodes to transfer in an aggregated (e.g., summed) fashion onto the FD node.

The SF device is disposed between a source follower voltage (VDD_SF) and the SEL device, with its gate coupled to the FD node. Thus, the SF device turns allows current to flow in an amount corresponding to the amount of accumulated photocharge from the imaging pixels that has been transferred onto the shared FD node. The SEL device has a gate coupled to a row select line and is disposed between the SF device and a voltage readout line, which is also coupled to a current source (IBIAS). Thus, when the row is selected (i.e., the SEL device is ON), an binned sensor output level (i.e., an analog output voltage signal, VOUT) develops at the voltage readout line to correspond to the amount of aggregated accumulated photocharge transferred to the FD node. This analog VOUT signal can be converted to a digital binned pixel value by an analog-to-digital converter ADC for readout via a readout line (e.g., a column readout line). The illustrated devices can be implemented in any suitable manner, such as using NMOS transistors and/or PMOS transistors.

As shown, some implementations include data storage, such as a register or other storage device for storing the read out digital binned pixel value. For example, the storage device can be used to collect the various binned pixel values from across the sensor array 120 to generate the RGB capture frame 132 and the L capture frame 134. A controller is also shown for context. The controller can be implemented by the sensor controller 150 of FIG. 1 to provide any suitable clock signals, control signals, etc. to implement a desired pixel binning scheme. For example, the controller outputs control signals to turn ON or OFF the transfer gates, RST device, SEL device, and/or other components to implement features of the pixel-binned readout.

While the implementation of FIG. 3 shows four imaging pixels being charge-binned, similar techniques can be used with various numbers and/or combinations of pixels. For example, essentially same circuit 300 can be used with two imaging pixels, eight imaging pixels, or any other suitable number of imaging pixels, to the extend supportable by other device components in the circuit 300. Also, the same circuit 300 can be used to charge bin selected subsets of the imaging pixels coupled with a shared FD node. For example, in a rolling shutter type of readout, a first readout cycle can concurrently transfer charge from Pixel 1 and Pixel 2 for readout (i.e., by turning ON TX1 and TX2), and next readout cycle can concurrently transfer charge from Pixel 3 and Pixel 4 for readout (i.e., by turning ON TX3 and TX4).

Figure 4A:
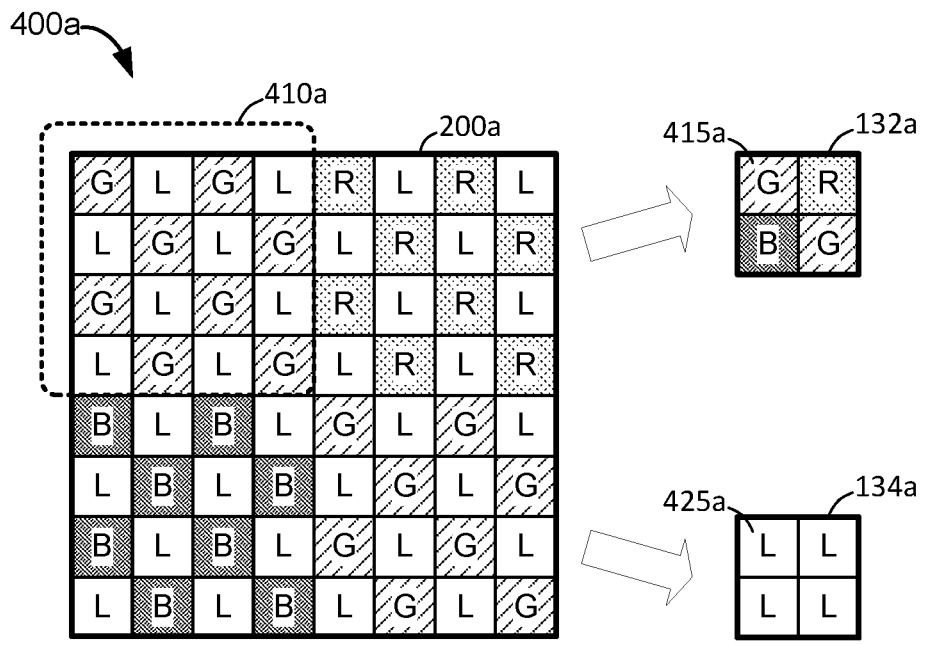
FIGS. 4A-4D show four examples of pixel binning schemes implemented using a the non-Bayer RGBL CFAs of FIGS. 2A-2D, respectively, according to various embodiments described herein.

FIGS. 4A-4D show four examples of pixel binning schemes 400 implemented using a the non-Bayer RGBL CFAs 200 of FIGS. 2A-2D, respectively, according to various embodiments described herein. Turning first to FIG. 4A, the hexa-deca RGBL CFA 200a of FIG. 2A is shown pixel-binned concurrently into a 2-by-2 RGB capture frame 132a and a 2-by-2 L capture frame 134a. This is a type of 4-by-4 pixel binning scheme, such that the resolution is downsampled by a factor of four in both the horizontal and vertical dimensions. For example, an upper-left quadrant of imaging pixels (i.e., 16 of the 64 total imaging pixels) of the hexa-deca RGBL CFA 200a is indicated by a dashed rectangle 410a. The eight G imaging pixels in quadrant 410a are pixel binned (e.g., by charge binning, or other suitable technique) to yield binned pixel 415a in the corresponding quadrant of RGB capture frame 132a, and the eight L (e.g., W) imaging pixels in quadrant 410a are pixel binned (e.g., by the same technique) to yield binned pixel 425a in the corresponding quadrant of L capture frame 134a.

Figure 4B:
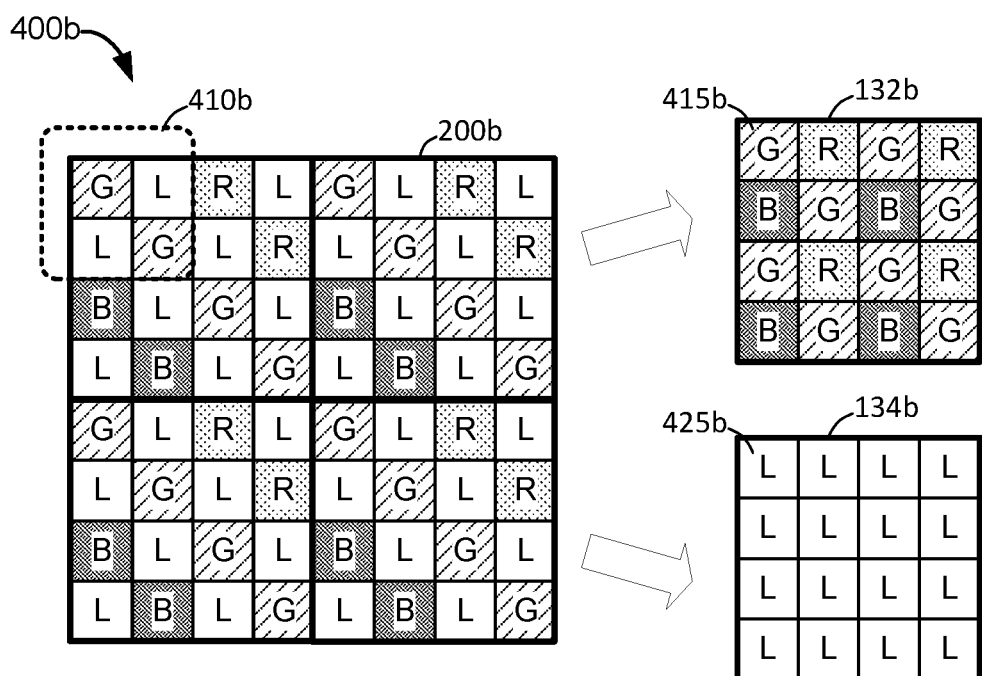

In FIG. 4B, the quad RGBL CFA 200b of FIG. 2B is shown pixel-binned concurrently into a 4-by-4 RGB capture frame 132b and a 4-by-4 L capture frame 134b. This is a type of 2-by-2 pixel binning scheme, such that the resolution is downsampled by a factor of two in both the horizontal and vertical dimensions. For example, an upper-left quadrant of an upper left quadrant of imaging pixels (i.e., 4 of the 64 total imaging pixels) of the quad RGBL CFA 200b is indicated by a dashed rectangle 410b. The two G imaging pixels in quadrant 410b are pixel binned to yield binned pixel 415b in the corresponding position of RGB capture frame 132b, and the two L imaging pixels in quadrant 410b are pixel binned to yield binned pixel 425b in the corresponding position of L capture frame 134b.

Figure 4C:
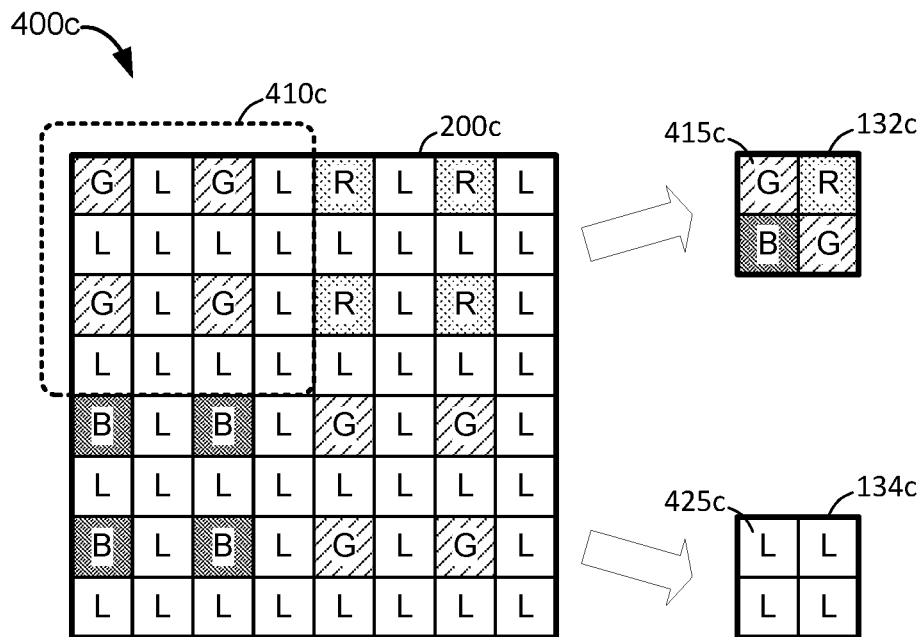

In FIG. 4C, the sparse hexa-deca RGBL CFA 200c of FIG. 2C is shown pixel-binned concurrently into a 2-by-2 RGB capture frame 132c and a 2-by-2 L capture frame 134c. This is another type of 4-by-4 pixel binning scheme, similar to the scheme of FIG. 4A. However, here, the upper-left quadrant 410c includes only four G imaging pixels, but 12 L imaging pixels. The four G imaging pixels are pixel binned to yield binned pixel 415c in the corresponding quadrant of RGB capture frame 132c, and the 12 L imaging pixels in quadrant 410c are pixel binned to yield binned pixel 425c in the corresponding quadrant of L capture frame 134c.

Figure 4D:
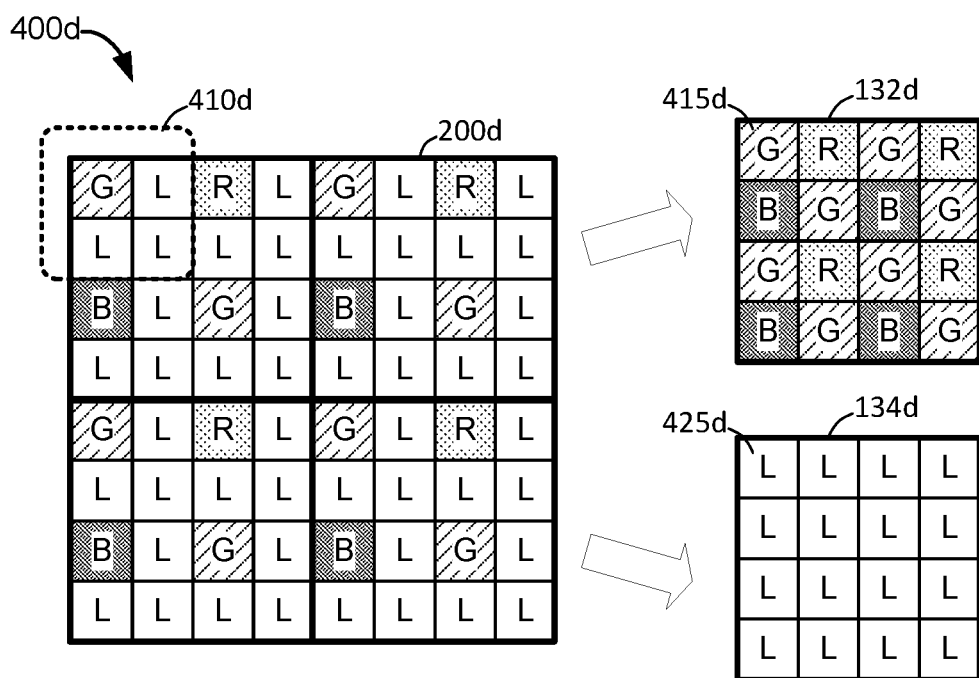

In FIG. 4D, the sparse quad RGBL CFA 200d of FIG. 2B is shown pixel-binned concurrently into a 4-by-4 RGB capture frame 132d and a 4-by-4 L capture frame 134d. This is another type of 2-by-2 pixel binning scheme, similar to the scheme of FIG. 4B. However, here, the upper-left quadrant of the upper left quadrant (the four pixels indicated by dashed rectangle 410d) includes only a single G imaging pixel and three L imaging pixels. In this case, the RGB capture frame 132d is generated without pixel binning, and the three L imaging pixels in quadrant 410d are pixel binned to yield binned pixel 425d in the corresponding position of L capture frame 134d. FIGS. 4A-4D describe only some of the possible pixel binning approaches that can be used with RGBL CFAs. Some other examples of pixel binning approaches that can be used with RGBL CFAs are described in U.S. patent application Ser. No. 17/382,354, titled "PIXEL BINNING FOR HEXA-DECA RGBW COLOR FILTER ARRAYS," filed on Jul. 22, 2021, which is hereby incorporated by reference in its entirety.

Returning again to FIG. 1, the binning readout circuitry 130 performs pixel-binned readout of the sensor output levels from the sensor array 120 during the readout time window of each imaging time window to generate two downsampled capture frames. The readout can be performed according to a global shutter readout, a rolling shutter readout, or in any other manner until all the sensor output levels are read out of the sensor array 120 (i.e., as part of a binned set of sensor output levels). Thus, upon completion of the readout time window, a full (downsampled) RGB capture frame 132 and a full (downsampled) L capture frame 134 have been generated by the binning readout circuitry 130. As noted above with reference to FIG. 3, the binned pixel values that make up the capture frames can be temporarily stored in any suitable data storage, such as registers or other storage devices integrated with the CIS system 110 (e.g., on the same chip as the binning readout circuitry 130).

Still in the same imaging window (i.e., in the same image sensor output path), embodiments of the sensor controller 150 direct the upsampling engine 140 to generate a luminance-enhanced (LE) output image 145 based on both the RGB capture frame 132 and the L capture frame 134. The sensor array 120 has a particular maximum "native" resolution defined at least by the number of imaging pixels. For example, a sensor array 120 with 48 million imaging pixels can be said to have a maximum native resolution of 48 Megapixels. As described above, the downsampled RGB capture frame 132 and L capture frame 134 each have a resolution that is appreciably lower than the maximum resolution of the sensor array 120. For example, if a 2-by-2 pixel binning scheme is applied to a sensor array 120 with a maximum native resolution of R, each of the RGB capture frame 132 and the L capture frame 134 can have a resolution of approximately R/4 (the result may not be exactly R/4, for example, if some imaging pixels at the edges of the sensor array 120 cannot be pixel binned in the same manner as those away from the edges). Similarly, if a 4-by-4 pixel binning scheme is applied to a sensor array 120 with a maximum native resolution of R, each of the RGB capture frame 132 and the L capture frame 134 can have a resolution of approximately R/16. Embodiments of the upsampling engine 140 can generate the LE output image 145 to have any suitable resolution that is greater than that of the downsampled capture frames (i.e., each of the RGB capture frame 132 and the L capture frame 134). In some implementations, the upsampling engine 140 generates the LE output image 145 to have a resolution equal to that of the maximum native resolution of the sensor array 120. In other implementations, the upsampling engine 140 generates the LE output image 145 to have a resolution between that of the downsampled capture frames and the maximum native resolution of the sensor array 120. In other implementations, the upsampling engine 140 generates the LE output image 145 to have a resolution greater than the maximum native resolution of the sensor array 120.

Conventional upsampling approaches tend to be applied to RGB CFAs by interpolating between pixels of a same color plane. However, those pixels are spaced relatively far apart in some CFAs, and interpolation accuracy reduces with greater separation between the measured pixel values. For example, in a conventional Bayer RGB array, each 2-by-2 block of imaging pixels can follow the pattern: {R, G; G, B}. In such a pattern, each R pixel may be separated from any adjacent R pixel (e.g., the R pixel in the right-adjacent block) by a single G pixel. Upscaling such a pattern by a factor of two can yield a 4-by-4 array, such as: {R, ?, G, ?; ?, ?, ?, ?; G, ?, B, ?; ?, ?, ?, ?} (where '?' represents an undefined value of the array). Now, each R pixel is separated from any adjacent R pixel by three pixel locations. Other CFA patterns and/or larger degrees of upscaling yield even greater separation between pixels sharing a color plane. Some other conventional up-sampling approaches applied to conventional CFAs seek to extrapolate between pixels across different color planes. However, such extrapolation across different color planes tends to be unable to distinguish between changes in color and changes in intensity.

Embodiments described herein use non-Bayer RGBL CFAs (e.g., non-Bayer RGBL CFAs 200) to provide an additional luminance plane that spatially corresponds to, but is color-separated from, all RGB color planes. Indeed, introduction of the L plane in the RGBL CFAs reduces the overall resolution of the RGB color planes, as compared to a sensor array of the same native resolution having only RGB pixels. However, the luminance information provided by the dense population of L pixels in the sensor array 120 is felicitous to upsampling at least because of the large amount of light collected by the L imaging pixels relative to the amount collects by the RGB imaging pixels, the ability to differentiate between overall luminance information of the L imaging pixels and color-specific intensity information of the RGB imaging pixels, and the spatial and temporal correspondence between the data captured in the L plane and the data captured in the RGB planes (i.e., because the L imaging pixels and the RGB imaging pixels are in the same sensor array 120 being exposed to the same incident light in the same imaging time window).

Figure 5:
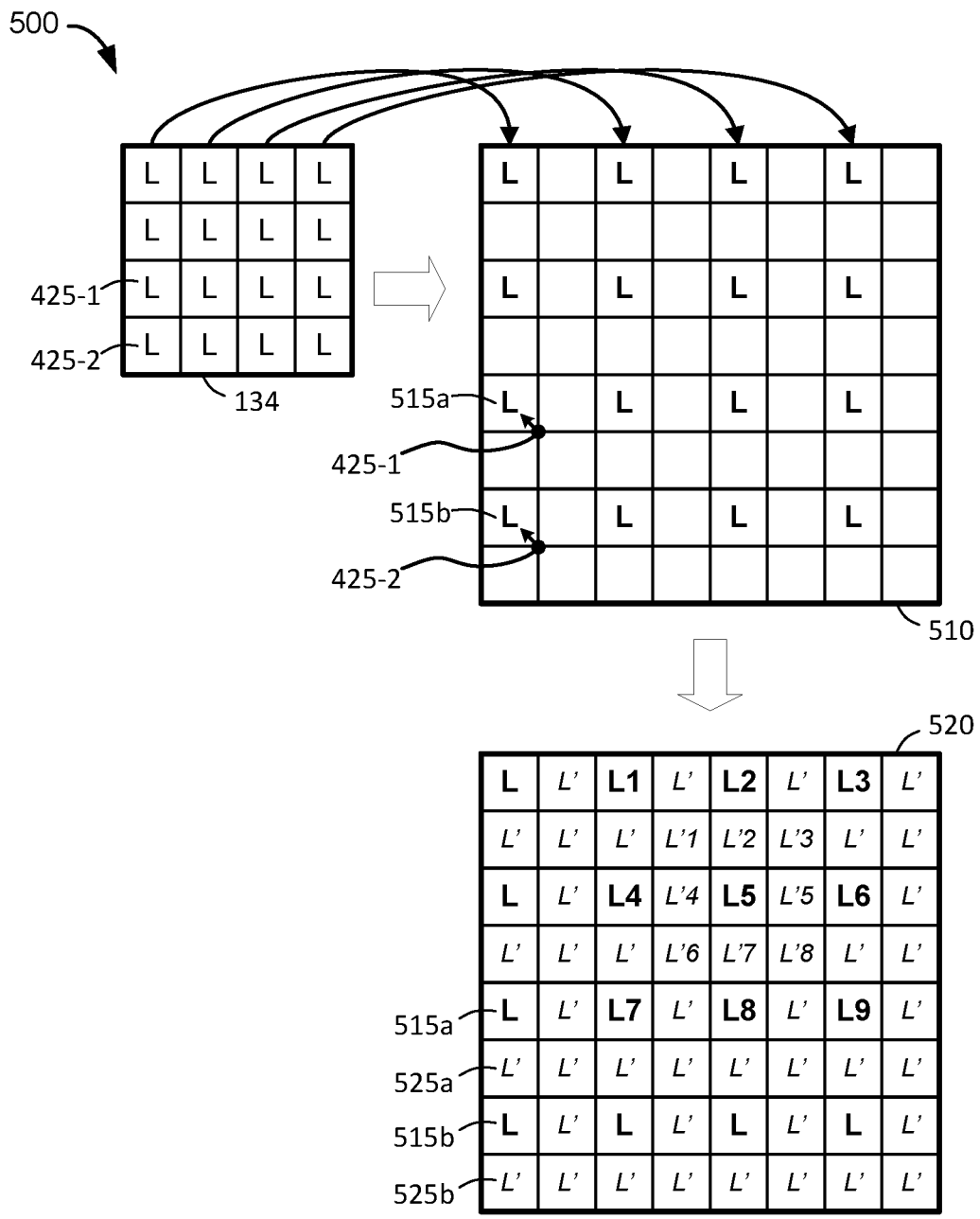
FIG. 5 shows a representative flow diagram of one illustrative stage of generating the LE output image in which a downsampled L capture frame is used to generate an upsampled L guide frame.
Figure 6A:
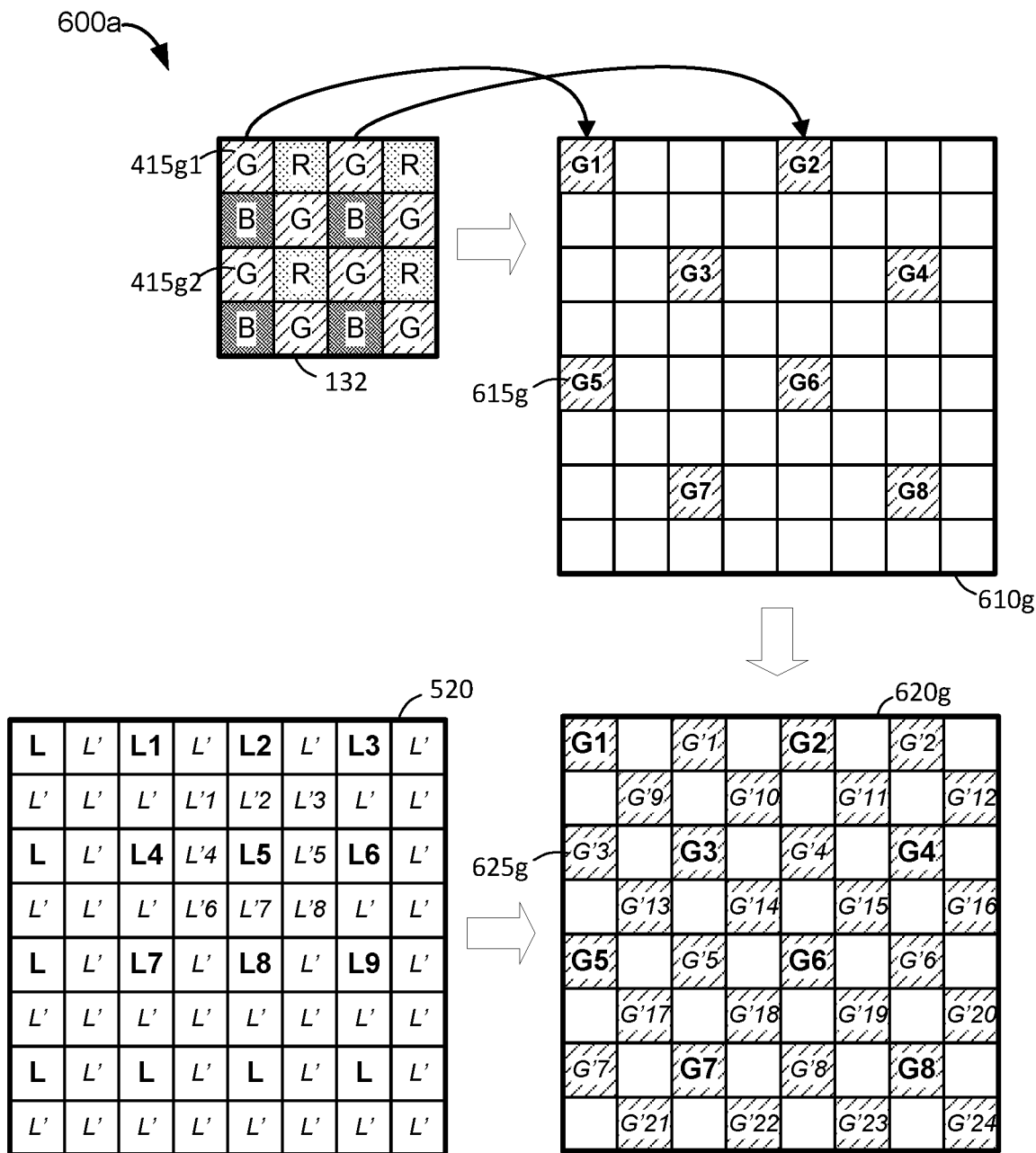
FIGS. 6A-6C show representative flow diagrams of illustrative stages of generating the LE output image in which an upsampled L guide frame is used to provide luminance-guided upsampling of a downsampled RGB capture frame to generate color planes of an upsampled RGB frame.
Figure 6B:
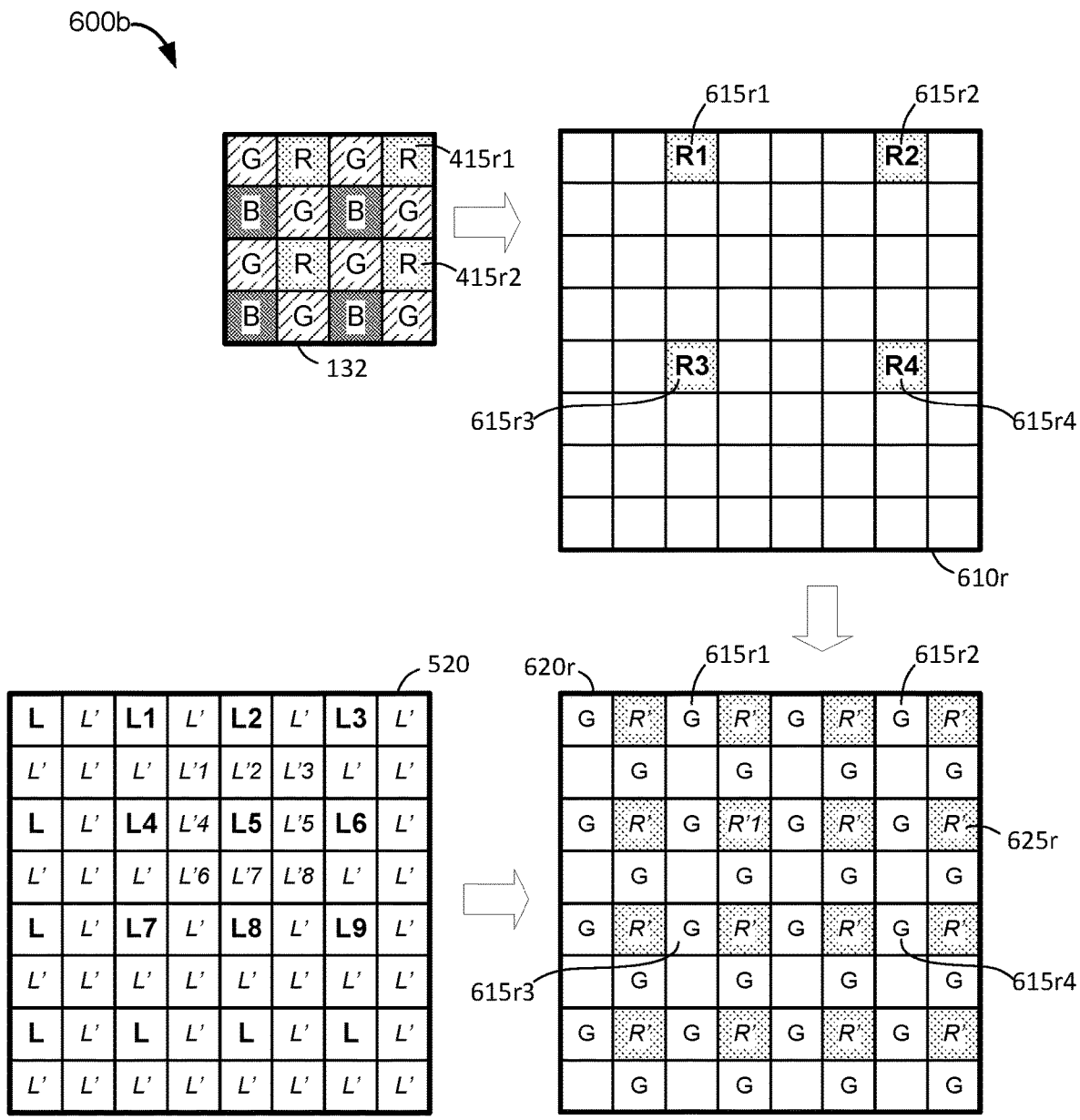
Figure 6C:
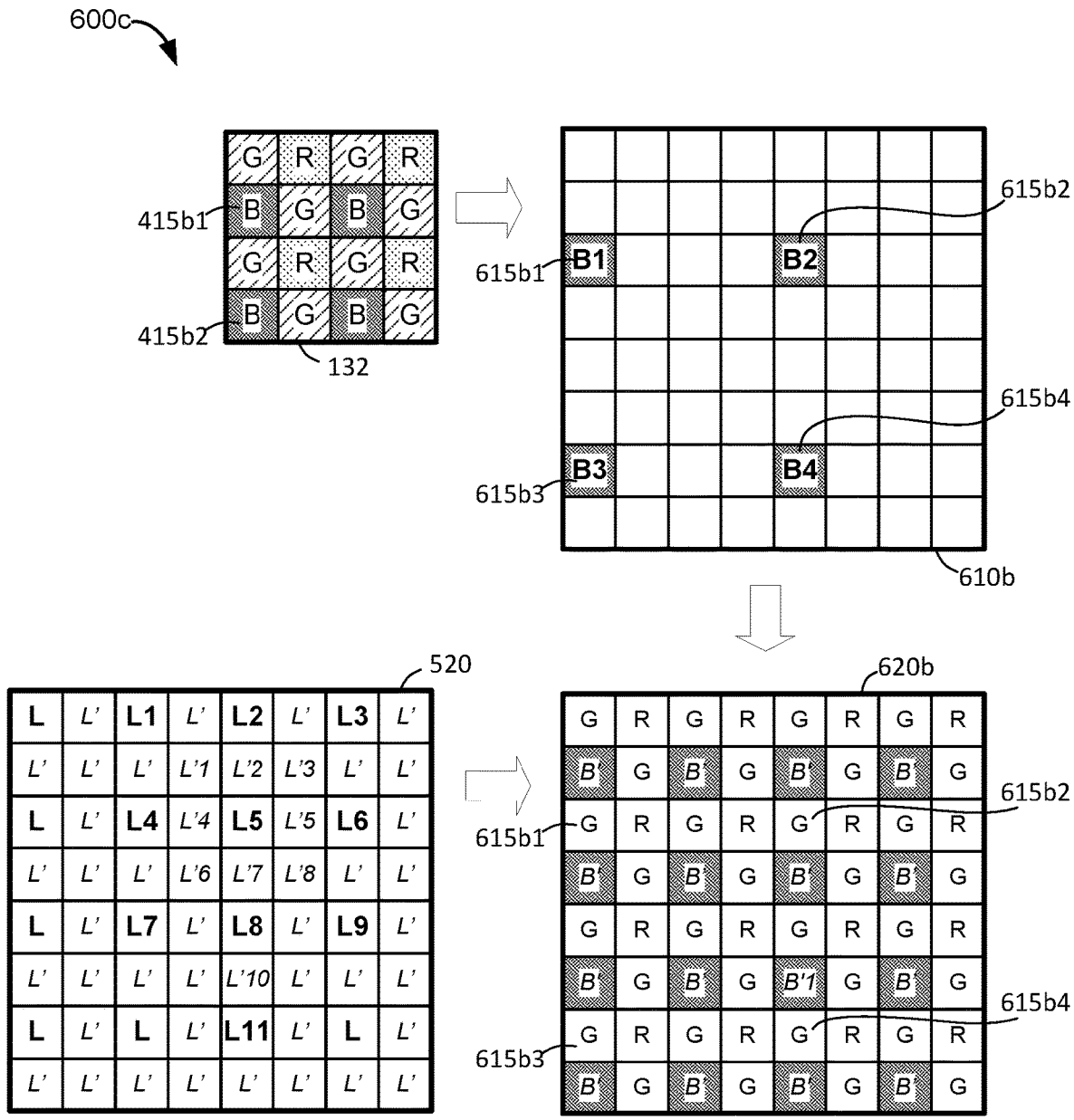

FIGS. 5-6C show representative flow diagrams of an illustrative manner of generating the LE output image 145 by the upsampling engine 140 by using the L capture frame 134 to upsample and remosaic the RGB capture frame 132. In general, the upsampling engine 140 can produce an upsampled L guide frame 520 from the L capture frame 134. A remosaicking operation is performed on each color plane of the RGB capture frame 132 based on the L guide frame 520. The representations of FIGS. 5-6C assume that the pixel binning scheme 200b of FIG. 2B was used to generate the RGB capture frame 132 and the L capture frame 134, but similar techniques can be applied to any other suitable pixel binning scheme.

Turning first to FIG. 5, a first representative flow diagram 500 is shown beginning with the L capture frame 134 (e.g., L capture frame 134b of FIG. 2B). The L capture frame 134 is upscaled to produce an upscaled L frame 510. The upscaled L frame 510 has a size configured to support the target resolution of the LE output image 145, which is larger than (e.g., an integer multiple of) the resolution of the L capture frame 134. As such, the upscaled L frame 510 includes more array locations than the L capture frame 134. As described above, the L capture frame 134 is an array of binned L pixel values 425, each generated by combining information from multiple photo-sensor outputs. As such, each binned L pixel value 425 approximates the luminance information for a corresponding location in the captured scene (i.e., in the incident illumination to which the sensor array 120 was exposed).

When upscaling, each binned L pixel value 425 can be considered as indicating the luminance information for some point in space that may not correspond to any particular array location (i.e., upscaled L pixel 515) of the upscaled L frame 510. For example, the illustrated upscaled L frame 510 is upscaled by a factor of two in each of the horizontal and vertical dimensions, such that each single binned L pixel value 425 can be considered as being upscaled into a respective 2-by-2 block of four upscaled L pixels 515. As illustrated, each binned L pixel value 425 can be considered as the value at the center of its corresponding 2-by-2 block of four upscaled L pixels 515. In some embodiments, each binned L pixel value 425 is directly mapped to a respective one of the upscaled L pixel 515 in a consistent manner. In the illustrated implementation, each binned L pixel value 425 is directly mapped to the upper-left upscaled L pixel 515 of its corresponding 2-by-2 block. For example, binned L pixel value 425-1 is mapped to upscaled L pixel 515a, and binned L pixel value 425-2 is mapped to upscaled L pixel 515b. After the upscaling, the upscaled L frame 510 can include substantially the same resolution as the L capture frame 134, but with a reduced pixel density. For example, the L capture frame 134 includes 16 "known" luminance values in 16 possible array locations to yield 100-percent pixel density; the upscaled L frame 510 includes the same 16 "known" luminance values, but in 64 possible array locations, yielding 25-percent pixel density. The remaining 48 array locations of the upscaled L frame 510 are "unknown," such that their respective data is undefined, empty, etc.

Each unknown array location of the upscaled L frame 510 can then be filled in by upsampling to produce the upsampled L guide frame 520. Embodiments can use any suitable interpolation technique to generate values for the unknown locations of the upscaled L frame 510. In some implementations, for each unassigned location, values of some or all known nearest-neighbor array locations (e.g., locations directly corresponding to binned L imaging pixel data in the L capture frame 134) are used to estimate a pixel value for the unassigned location. Other embodiments compute estimated L pixel 525 values using a bilinear technique. Other embodiments compute estimated L pixel 525 values using a bi-cubic technique.

In the upsampled L guide frame 520, cells with known luminance values from the upscaled L frame 510 are indicated with bold-face as L, and cells with upsampled luminance values computed from the known luminance values are indicated with italics as L'. For ease of reference, certain cells are also numbered. As an example of certain interpolation techniques noted above, the interpolation can proceed in an iterative manner. In one iteration, the value of cell L'1 can be interpolated from the values of its nearest-neighboring square of cells, L1, L2, L4, and L5, for example, by averaging the four known values to arrive at the single unknown value. Similarly, the unknown value of cell L'3 can be interpolated from the known values cells L2, L3, L5, and L6; the unknown value of cell L'6 can be interpolated from the known values cells L4, L5, L7, and L8; and the unknown value of cell L'8 can be interpolated from the known values cells L5, L6, L8, and L9. In a next iteration, interpolated valued from the preceding iteration can now be used to interpolate additional unknown values. For example, the nearest neighbors of L'2 are a diamond consisting of originally known cells L2 and L5, and previously interpolated cells L'1 and L'3. A similar approach can be used to interpolate the values of cells L'4, L'5, and L'7. Using such techniques, the entire L guide frame 520 can be upsampled with a combination of upscaled L pixels 515 and estimated L pixels 525 to achieve a 100-percent L pixel density in the L guide frame 520 with the target resolution of the LE output image 145.

Turning to FIGS. 6A-6C, each shows a flow diagram 600 of a portion of a remosaicking operation for a respective color plane of the RGB capture frame 132. While FIGS. 6A-6C illustrate a sequence of upsampling for green then red then blue, the RGB color planes can be upsampled in other orders. Further, while the result of the remosaicing of FIGS. 6A-6C is an LE output image 145 of a particular resolution and following a standard Bayer RGB pattern, the remosaicing can be adapted to result in LE output images 145 of other resolutions and/or other RGB patterns. Embodiments of the upsampling engine 140 can be configured to produce the LE output image 145 in accordance with a defined output image schema (or set of predefined output image schema), such as a particular resolution, CFA pattern, etc. The LE output image 145 is the image data output by the CIS system 110 to downstream components, such as the processor-controlled system 160. In some embodiments, the processor-controlled system 160 is designed to receive, from the CIS system 110, an output image frame that is formatted according to the particular output image schema. For example, the processor-controlled system 160 can be designed with standard physical and logical interfaces configured to receive an image frame from the CIS system 110 with a defined resolution and a conventional (e.g., standard Bayer RGB) CFA pattern. In such embodiments, the upsampling engine 140 is configured to generate the LE output image 145 in accordance with such image frame parameters.

In FIG. 6A, a representative flow diagram 600a is shown for upsampling of the green color plane. The flow diagram 600a begins with an RGB capture frame 132 (e.g., RGB capture frame 132b of FIG. 2B). The RGB capture frame 132 is upscaled to produce an upscaled G frame 610g by assigning known binned G imaging pixel 415g of the RGB capture frame 132 to corresponding locations of the upscaled G frame 610g. The upscaled G frame 610g is configured to have the same size as that of the upscaled L frame 510 to support the target resolution of the LE output image 145. Similar to the description above with reference to FIG. 5, each binned G imaging pixel 415g approximates the green color information for a corresponding location in the captured scene, which can generally be considered as corresponding to some point in space relative to the upscaled G frame 610g (but not necessarily corresponding to any particular array location in the upscaled G frame 610g). As such, embodiments can choose a manner in which to map each binned G imaging pixel 415g to a particular upscaled G pixel 615g of a corresponding 2-by-2 block of upscaled G pixels 615g in the upscaled G frame 610g. To avoid introducing certain artifacts, it is can be desirable to map values in the L and RGB planes in a consistent manner. For example, if each binned L pixel value 425 is mapped to the upper-left upscaled L pixel 515 in its corresponding 2-by-2 block of the upscaled L frame 510, embodiments can similarly map each binned G imaging pixel 415g to the upper-left upscaled G pixel 615g in its corresponding 2-by-2 block of the upscaled G frame 610g. After the upscaling, the upscaled G frame 610g can have substantially the same resolution as the G color plane of the RGB capture frame 132, but with a reduced pixel density. For example, the RGB capture frame 132 includes 8 "known" G values in 16 possible array locations to yield 50-percent pixel density; the upscaled G frame 610g includes the same 8 "known" G values, but in 64 possible array locations, yielding 12.5-percent pixel density. The remaining 56 array locations of the upscaled G frame 610g are "unknown," such that their respective data is undefined, empty, etc.

Unknown G values in the upscaled G frame 610g can be filled in by upsampling to produce an upsampled G frame 620g. In some implementations, the upsampled G frame 620g is generated and stored as a separate array of G values. In other implementations, the upsampled G frame 620g represents the G color plane data of an upsampled RGB frame 620, which includes the upsampled G frame 620g and upsampled R and B frames, as described below. The upsampling of the upscaled G frame 610g can include at least two features. A first feature is that the upsampling interpolates G color values for a particular portion of the cells of the upsampled G frame 620g in accordance with a predefined target CFA pattern. A second feature is that the upsampling is luminance-guided interpolation based on the upsampled L guide frame 520.

Regarding the first feature, as noted above, an output image schema can define both a target resolution and a target CFA pattern for the LE output image 145. These schema definitions can effectively define which cells of the upsampled G frame 620g (or of the upsampled RGB frame 620) are assigned to the G color plane. For example, the illustrated output image schema used for FIGS. 6A-6C assumes a standard Bayer RGB pattern that includes repeating 2-by-2 blocks of R, G, G, B pixels. According to such a schema, every other cell in the frame is assigned to the G color plane in a checkerboard pattern. As such, the upsampling of the upscaled G frame 610g can be performed in a manner that interpolates G color values only for those cells assigned to the G color plane according to the output image schema. As illustrated, the upsampled G frame 620g resulting from the upsampling operation has 50-percent density of G pixels, corresponding to the target color plane resolution and that CFA pattern (Bayer RGB pattern) for the illustrative LE output image 145.

Regarding the second feature, the upsampling is referred to herein as "luminance-guided" interpolation, as the interpolation is guided by the L guide frame 520. As described above, the L guide frame 520 is upsampled to have 100-percent density of luminance information, such that every cell of the upsampled G frame 620g (e.g., and of the upsampled RGB frame 620, more generally) can have a one-to-one spatial correspondence with a respective one of the cells of the upsampled L guide frame 520. Thus, unknown G values in the upsampled G frame 620g are interpolated based both on neighboring known (or previously interpolated) G values and on local luminance information from the L guide frame 520. Embodiments can apply luminance-guided techniques to any suitable interpolation approach, such as to a nearest-neighbor, bi-cubic, or other approach. Luminance-guided interpolation can use the upsampled L guide frame 520 information in any suitable manner to weight and/or normalize G color information to improve interpolation in the G color plane. Some embodiments implement luminance-guided interpolation for a particular cell by using neighboring G color plane information to obtain a initial G color value for the cell, then weighting the initial G color value based on one or more local L values in corresponding locations of the L guide frame 520 to produce an estimated G pixel 625g for that cell. Other embodiments implement luminance-guided interpolation for a particular cell by weighting the neighboring G color plane information based on local L values in corresponding locations of the L guide frame 520 to obtain the initial G color value for the cell, then re-weighting the initial G color value based on the local L value in the location of the L guide frame 520 corresponding to the cell to produce the estimated G pixel 625g for that cell.

As one example of luminance-guided interpolation, the interpolation can proceed in an iterative manner. In one iteration, the estimated G pixel 625g value of cell G'4 can be interpolated from the values of its nearest-neighboring diamond of cells, G2, G3, G4, and G5. In one implementation, the four known values are averaged to arrive at a single initial value for G'4. The initial value can now be adjusted by differences in luminance information for corresponding cells of the L guide frame 520. For example, cells G2, G3, G4, G5, and G'4 of the upsampled G frame 620g spatially correspond to cells L2, L4, L6, L8, and L5 of the L guide frame 520, respectively. Some implementations use a color-ratio approach to multiply the average of the values of cells G2, G3, G4, and G5 by a ratio of the value of cell L5 to the average of the values of cells L2, L4, L6, and L8. Other implementations use a color-difference approach to find a difference between the value of cell L5 and the average of the values of cells L2, L4, L6, and L8, and add that difference to the average of the values of cells G2, G3, G4, and G5. The color difference approach can be preferred in some implementations, as it can be implemented without hardware divide operations. In both the color-ratio approach and the color-difference approach, spatially corresponding L values are used to adjust the interpolation in the color plane to account for local changes in luminance that would not otherwise be captured by the particular color plane information. Continuing with the example of luminance-guided interpolation, the same approach can be used to produce an estimated G pixel 625g value for cell G'5 based on cells G3, G5, G6, and G7 and spatially corresponding cells from the L guide frame 520. In subsequent iterations, previously interpolated values can be used for further interpolation in the same manner. For example, the same approach can be used to produce an estimated G pixel 625g value for cell G'14 based on cells G3, G'4, G'5, and G6 (its nearest neighbors), and spatially corresponding cells from the L guide frame 520 (L4, L5, L7, L8, and L'6).

Turning to FIG. 6B, a representative flow diagram 600b is shown for upsampling of the red color plane. The flow diagram 600b begins with an RGB capture frame 132 (e.g., RGB capture frame 132b of FIG. 2B). The RGB capture frame 132 is upscaled to produce an upscaled R frame 610r by assigning known binned R imaging pixel 415r of the RGB capture frame 132 to corresponding locations of the upscaled R frame 610r. The upscaled R frame 610r is configured to have the same size as that of the upscaled G frame 610g. Upscaling of the RGB capture frame 132 to produce the upscaled R frame 610r can be performed in the same manner as described for producing the upscaled G frame 610g. For example, each binned R imaging pixel 415r can be mapped to the upper-left upscaled R pixel 615r in a corresponding 2-by-2 block of the upscaled R frame 610r. In the illustrated case, the RGB capture frame 132 includes 4 "known" R values in 16 possible array locations to yield 25-percent pixel density for the R color plane; the upscaled R frame 610r includes the same 4 "known" R values, but in 64 possible array locations, yielding 6.25-percent pixel density. The remaining 60 array locations of the upscaled R frame 610r are "unknown," such that their respective data is undefined, empty, etc.

Unknown R values in the upscaled R frame 610r can be filled in by upsampling to produce an upsampled R frame 620r. In some implementations, the upsampled R frame 620r is generated and stored as a separate array of R values. In other implementations, the upsampled R frame 620r represents the R color plane data of an upsampled RGB frame 620, which includes the upsampled R frame 620r and upsampled G and B frames, as described below. For context, the G color plane cells (e.g., as previously produced in FIG. 6A) are indicated without shading in the upsampled R frame 620r. As described with reference to the G color plane in FIG. 6A, the upsampling of the upscaled R frame 610r can include at least two features: the upsampling interpolates R color values for a particular portion of the cells of the upsampled R frame 620r in accordance with the predefined target CFA pattern for the LE output image 145, and the upsampling is luminance-guided interpolation based on the upsampled L guide frame 520. Regarding the first feature, the illustrated upsampling in FIG. 6B is shown as producing R color values only for those cells assigned to the R color plane according to the output image schema. The illustrative result is an upsampled R frame 620r with 25-percent density of R pixels, corresponding to the target color plane resolution and that CFA pattern (Bayer RGB pattern) for the illustrative LE output image 145.

Regarding the second feature, the luminance-guided interpolation can be performed in a similar manner to any of the approaches described with reference to FIG. 6A. However, the particular case shown in FIG. 6B illustrates a couple of differences between the interpolation in FIG. 6A and that of FIG. 6B. First, in FIG. 6B (unlike in FIG. 6B), none of the known value locations of the upscaled R frame 610r directly coincide with R color plane cells in the upsampled R frame 620r. For reference, the upscaled R pixel 615r locations are shown relative to the upsampled R frame 620r, and it can be seen that the respective known values are not directly mapped to those locations (in fact those locations happen to correspond to cells in the G color plane). As such, all R values in the upsampled R frame 620r are estimated R pixel 625r values produced by luminance-guided interpolation.

Second, in FIG. 6B (unlike in FIG. 6B), the interpolated pixels are offset with respect to their neighboring pixels in the upsampled R frame 620r. For example, the estimated R pixel 625r indicated as R1 is closer to its nearest-neighboring known values 615r1 and 615r3 than it is to its nearest-neighboring known values 615r2 and 615r4. Embodiments can address the offset in various ways, such as by using a weighted average based on linear distance. For example, an initial value for cell R'1 can be computed as (3*(R1+R3)+(R2+R4))/8, such that the closer nearest-neighbors have an increased effect on the average (e.g., by a factor of 3). The initial value can then be adjusted based on the L guide frame 520, using a color-ratio or color-difference approach, to compute the estimated R pixel 625r value for cell R'1. For example, cells 615r1, 615r2, 615r3, 615r4, and R'1 in the upsampled R frame 620r spatially correspond to cells L1, L3, L7, L9, and L'4 of the L guide frame 520, respectively. Some implementations use a color-ratio approach to multiply the initial value (i.e., the weighted average of the values of cells R1, R2, R3, and R4) by a ratio of the value of cell L'4 to the average of the values of cells L1, L3, L7, and L9. Other implementations use a color-difference approach to find a difference between the value of cell L'4 and the average of the values of cells L1, L3, L7, and L9, and add that difference to the initial value (i.e., the weighted average of the values of cells R1, R2, R3, and R4). Similar approaches can be used to produce estimated R pixel 625r values for all 16 R color plane cells of the upsampled R frame 620r.

Turning to FIG. 6C, a representative flow diagram 600c is shown for upsampling of the blue color plane. The flow diagram 600c begins with an RGB capture frame 132 (e.g., RGB capture frame 132b of FIG. 2B). The RGB capture frame 132 is upscaled to produce an upscaled B frame 610b by assigning known binned B imaging pixels 415b of the RGB capture frame 132 to corresponding locations of the upscaled B frame 610b. The upscaled B frame 610b is configured to have the same size as that of the upscaled G frame 610g and upscaled R frame 610r. Upscaling of the RGB capture frame 132 to produce the upscaled B frame 610b can be performed in the same manner as described for producing the upscaled G frame 610g and upscaled R frame 610r. For example, each binned B imaging pixel 415r can be mapped to the upper-left upscaled B pixel 615b in a corresponding 2-by-2 block of the upscaled B frame 610b. In the illustrated case, the RGB capture frame 132 includes 4 "known" B values in 16 possible array locations to yield 25-percent pixel density for the B color plane; the upscaled B frame 610b includes the same 4 "known" B values, but in 64 possible array locations, yielding 6.25-percent pixel density. The remaining 60 array locations of the upscaled B frame 610b are "unknown," such that their respective data is undefined, empty, etc.

Unknown B values in the upscaled B frame 610b can be filled in by upsampling to produce an upsampled B frame 620b. In some implementations, the upsampled B frame 620b is generated and stored as a separate array of B values. In other implementations, the upsampled B frame 620b represents the B color plane data of an upsampled RGB frame 620, which includes the upsampled B frame 620b and upsampled G and R frames, as described below. For context, the G and R color plane cells (e.g., as previously produced in FIGS. 6A and 6B) are indicated without shading in the upsampled B frame 620b. As described with reference to the G and R color planes in FIGS. 6A and 6B, the upsampling of the upscaled B frame 610b can include at least two features: the upsampling interpolates B color values for a particular portion of the cells of the upsampled B frame 620b in accordance with the predefined target CFA pattern for the LE output image 145, and the upsampling is luminance-guided interpolation based on the upsampled L guide frame 520.

Regarding the first feature, the illustrated upsampling in FIG. 6C is shown as producing B color values only for those cells assigned to the B color plane according to the output image schema resulting in an upsampled B frame 620b with 25-percent density of B pixels located according to the target color plane resolution and that CFA pattern (Bayer RGB pattern) for the illustrative LE output image 145. Regarding the second feature, the luminance-guided interpolation can be performed in a similar manner to any of the approaches described with reference to FIGS. 6A and 6B. Similar to the R color plane, it can be seen that none of the known value locations of the upscaled B frame 610b directly coincide with B color plane cells in the upsampled B frame 620b (the known-value locations in the B color plane happen to correspond to cells in the G color plane). As such, all B values in the upsampled B frame 620b are estimated B pixel 625b values produced by luminance-guided interpolation.

Further, similar to the R color plane, the interpolated B pixels are all offset with respect to their neighboring pixels in the upsampled B frame 620b. As such, weighted averaging techniques can be applied. Some implementations can use a weighted bi-cubic approach similar to the one described with reference to FIG. 6B, with weightings adjusted based on the relative linear distances between each target cell and its nearest neighbors. Other implementations can use a weighted bi-linear approach to interpolate based only on two nearest neighbors, where appropriate. For example, cell B1 is adjacent to known-value location 615b4 and only one cell removed from known-value location 615b2, but is appreciably further from either of known-value locations 615b1 or 615b3. As such, a more reliable interpolation for cell B'1 may be achieved using a weighted bi-cubic approach based on known values B2 and B4, and luminance-guided adjustment based on cells L5, L11, and L'10. Similar approaches can be used to produce estimated B pixel 625b values for all 16 B color plane cells of the upsampled B frame 620b.

After all the upscaling and upsampling operations of FIGS. 6A-6C, the result is a set of upsampled color frame data (i.e., an upsampled G frame 620g, an upsampled R frame 620r, and an upsampled B frame 620b) that interleaves to form an upsampled RGB frame 620. As described above, the upsampled RGB frame 620 has a resolution and a CFA pattern corresponding to a defined output image schema for the LE output image 145. In some cases, strict application of upsampling techniques described above can result in edge artifacts. Embodiments include edge-detection and/or edge-sensing algorithms to adapt the upsampling to edge regions. For example, such algorithms can detect gradients in different directions that indicate edge behaviors, and the algorithms can adjust pixel weightings for interpolation, accordingly. In effect, the algorithms tend to impact the weightings and/or computations used to obtain the initial value for a particular cell prior to luminance-guided adjustment of that initial value. Thus, embodiments can use the various luminance-guided adjustment approaches described above (e.g., based on color-ratio, color-difference, etc.) to implement luminance guided interpolation near the edges.

Figure 7:
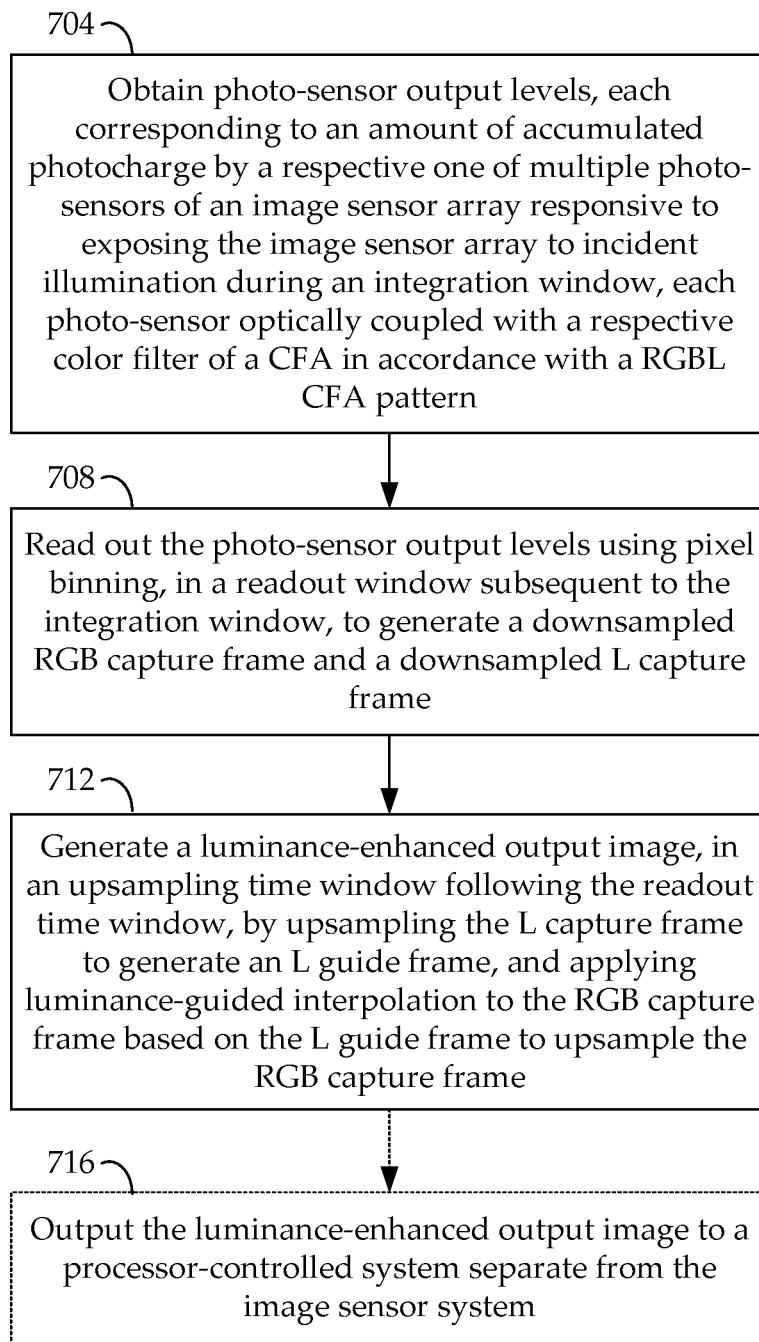
FIG. 7 shows a flow diagram of an illustrative method for high-resolution image capture, according to various embodiments described herein.

FIG. 7 shows a flow diagram of an illustrative method 700 for high-resolution image capture, according to various embodiments described herein. Embodiments of the method 700 can begin at stage 704 by obtaining photo-sensor output levels for each of a number of photo-sensors of an image sensor array. As described above, each photo-sensor output level corresponds to an amount of photocharge accumulated by a respective one of the photo-sensors of the image sensor array responsive to exposing the image sensor array to incident illumination during an integration time window. Also as described above, each photo-sensor is optically coupled with a respective color filter of a color filter array (CFA) in accordance with a red-green-blue-luminance (RGBL) CFA pattern, such that a portion of the image sensor array corresponds to luminance imaging pixels, and the remainder of the image sensor array corresponds to color (e.g., RGB) imaging pixels. For example, the image sensor array can have 50-percent luminance density, whereby approximately 50-percent of the imaging pixels of the array are luminance imaging pixels and the remaining approximately 50-percent of the imaging pixels are color imaging pixels; or the image sensor array can have 75-percent luminance density, whereby approximately 75-percent of the imaging pixels of the array are luminance imaging pixels and the remaining approximately 25-percent of the imaging pixels are color imaging pixels.

At stage 708, embodiments can read out the photo-sensor output levels using pixel binning in a readout window subsequent to the integration window. The pixel binning can generate a downsampled RGB capture frame and a downsampled L capture frame. For example, charge binning, or any other suitable pixel binning approach can be used to combine readout of photo-sensor output levels to result in a pair of downsampled capture frames.

At stage 712, embodiments can generate a luminance-enhanced output image in an upsampling time window following the readout time window. The generating can involve upsampling the L capture frame to generate an L guide frame, and applying luminance-guided interpolation to the RGB capture frame based on the L guide frame to upsample the RGB capture frame. In some embodiments, the L guide frame is an array of L value cells, each having a respective luminance value. As such, the applying luminance-guided interpolation to the RGB capture frame can include generating an upsampled RGB frame to have an array of color value cells by, for each color value cell of a portion of the color value cells: generating a respective initial value for the color value cell based on interpolating a respective neighboring set of known color values based on the RGB capture frame; and computing an estimated color pixel value for the color value cell by adjusting the respective initial value based on the luminance values of those of the L value cells spatially corresponding to the color value cell and to the locations of the respective neighboring set of known color values. In subsequent iterations, estimated color values can be computed for additional portions of the color value cells using the same approach, but further involving estimated color values computed in prior iterations.

In some embodiments, upsampling the L capture frame to generate the L guide frame includes: upscaling the L capture frame to generate an upscaled L frame having a target frame size defined by an output image schema of the luminance-enhanced output image, a portion of the frame populated based on known luminance values from the L capture frame; and upsampling the upscaled L frame to generate the L guide frame based on interpolating the known luminance values, such that the L guide frame has 100-percent density of luminance information. In some embodiments, applying the luminance-guided interpolation to the RGB capture frame includes, for each color plane of the RGB capture frame: upscaling the color plane to generate a respective upscaled color frame, such that the respective upscaled color frame has a target frame size defined by an output image schema of the luminance-enhanced output image, and a portion of the respective upscaled color frame is populated based on respective known color values from the color plane; and upsampling the respective upscaled color frame to generate a respective upsampled color frame by applying the luminance-guided interpolation to the respective known color values based on the L guide frame. In some such embodiments, the output image schema further defines a target CFA pattern for the luminance-enhanced output image; and for each color plane of the RGB capture frame, upsampling the respective upscaled color frame generates the respective upsampled color frame by using the luminance-guided interpolation to remosaic the respective known color values based on the L guide frame into the target CFA pattern.

As described herein, the image sensor array has a native resolution. For example, the image sensor array can be an array of approximately 48 million imaging pixels, such that the native resolution is 48 Megapixels. In some embodiments, the pixel binning results in capture frames with downsampled resolutions of approximately one-fourth of the native resolution of the image sensor. For example, the RGB capture frame has a downsampled resolution of approximately 12 Megapixels, and the L capture frame has a downsampled resolution of approximately 12 Megapixels. In other embodiments, the pixel binning results in capture frames with resolutions of approximately 1/16 the native resolution of the image sensor. For example, the RGB capture frame has a downsampled resolution of approximately 4 Megapixels, and the L capture frame has a downsampled resolution of approximately 4 Megapixels. In some embodiments, the luminance-enhanced output image has an output resolution that is at least three times the downsampled resolutions. For example, each capture frame has a downsampled resolution of approximately 12 Megapixels, and the luminance-enhanced output image is generated to have an output resolution of at least 36 Megapixels. In some embodiments, the output resolution is approximately equal to the native resolution of the image sensor. For example, a 48-Megapixel sensor array is used to capture the image, and after downsampling and re-upsampling, the image sensor outputs a 48-Megapixel luminance-enhanced output image.

As described herein, some embodiments can further include outputting the luminance-enhanced output image at stage 716. For example, stages 704-412 can all be performed for any image capture window by an integrated image sensor system, such that the output of the image sensor system is the luminance-enhanced output image in some predetermined format defined by the output image schema. The output can be communicated to any suitable processor-controlled system separate from the image sensor system for storage, downstream processing, further communication, etc.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for high-resolution image capture using an image sensor system, the method comprising:

obtaining a plurality of photo-sensor output levels, each corresponding to an amount of photocharge accumulated by a respective one of a plurality of photo-sensors of an image sensor array responsive to exposing the image sensor array to incident illumination during an integration window, each of the plurality of photo-sensors optically coupled with a respective color filter of a color filter array (CFA) in accordance with a red-green-blue-luminance (RGBL) CFA pattern;

reading out the plurality of photo-sensor output levels using pixel binning, in a readout window subsequent to the integration window, to generate a downsampled RGB capture frame and a downsampled L capture frame; and generating a luminance-enhanced output image, in an upsampling time window following the readout time window, by upsampling the L capture frame to generate an L guide frame, and applying luminance-guided interpolation to the RGB capture frame based on the L guide frame to upsample the RGB capture frame.

2. The method of claim 1, further comprising:
outputting the luminance enhanced output image to a processor-controlled system separate from the image sensor system.

3. The method of claim 1, wherein the upsampling the L capture frame to generate the L guide frame comprises:
upscaling the L capture frame to generate an upscaled L frame having a target frame size defined by an output image schema of the luminance-enhanced output image, a portion of the frame populated based on known luminance values from the L capture frame; and
upsampling the upscaled L frame to generate the L guide frame based on interpolating the known luminance values, such that the L guide frame has 100-percent density of luminance information.

4. The method of claim 1, wherein the applying luminance-guided interpolation to the RGB capture frame comprises, for each color plane of the RGB capture frame:
upscaling the color plane to generate a respective upscaled color frame, such that the respective upscaled color frame has a target frame size defined by an output image schema of the luminance-enhanced output image, and a portion of the respective upscaled color frame is populated based on respective known color values from the color plane; and
upsampling the respective upscaled color frame to generate a respective upsampled color frame by applying the luminance-guided interpolation to the respective known color values based on the L guide frame.

5. The method of claim 4, wherein
the output image schema further defines a target CFA pattern for the luminance-enhanced output image; and
for each color plane of the RGB capture frame, the upsampling the respective upscaled color frame generates the respective upsampled color frame by using the luminance-guided interpolation to remosaic the respective known color values based on the L guide frame into the target CFA pattern.

6. The method of claim 1, wherein:
the L guide frame comprises an array of L value cells, each having a respective luminance value; and
the applying luminance-guided interpolation to the RGB capture frame comprises generating an upsampled RGB frame to have an array of color value cells by, for each color value cell of a portion of the color value cells:

generating a respective initial value for the color value cell based on interpolating a respective neighboring set of known color values based on the RGB capture frame; and computing an estimated color pixel value for the color value cell by adjusting the respective initial value based on the luminance values of those of the L value cells spatially corresponding to the color value cell and to the locations of the respective neighboring set of known color values.

7. The method of claim 6, wherein the adjusting comprises:
computing a color-ratio or a color-difference between the L value cell spatially corresponding to the color value cell, and those of the L value cells spatially corresponding to the locations of the respective neighboring set of known color values; and
adjusting the initial value of the color value cell based on the color-ratio or the color-difference.

8. The method of claim 1, wherein:
the image sensor array has a native resolution;
the RGB capture frame has a downsampled resolution that is less than or equal to one-fourth of the native resolution; and
the luminance-enhanced output image has an output resolution that is at least three times the downsampled resolution.

9. The method of claim 8, wherein the output resolution is equal to the native resolution.

10. The method of claim 1, wherein the RGBL CFA pattern of the image sensor array has a 50-percent density of luminance imaging pixels and a 50-percent density of color imaging pixels.

11. The method of claim 1, wherein the RGBL CFA pattern of the image sensor array has a 75-percent density of luminance imaging pixels and a 25-percent density of color imaging pixels.

12. The method of claim 1, wherein the pixel binning is charge binning.

13. An image sensor comprising:
a photo-sensor array comprising a plurality of photo-sensor, each photo-sensor optically coupled with a respective color filter of a color filter array (CFA) in accordance with a red-green-blue-luminance (RGBL) CFA pattern, the plurality of photo-sensors configured to generate a plurality of photo-sensor output levels corresponding to an amount of photocharge accumulated responsive to exposure to incident illumination during an integration window;
binning readout circuitry coupled with the photo-sensor array to read out the plurality of photo-sensor output levels using pixel binning, in a readout window subsequent to the integration window, to generate a downsampled RGB capture frame and a downsampled L capture frame; and
an upsampling engine coupled with the binning readout circuitry to generate a luminance-enhanced output image, in an upsampling time window following the readout time window, by upsampling the L capture frame to generate an L guide frame, and applying luminance-guided interpolation to the RGB capture frame based on the L guide frame to upsample the RGB capture frame.

14. The image sensor of claim 13, further comprising:
a sensor controller coupled with at least the binning readout circuitry and the upsampling engine, such that:

the sensor controller is to generate and output first control signals to direct the binning readout circuitry to read out the plurality of photo-sensor output levels using the pixel binning; and the sensor controller is to generate and output second control signals to direct the upsampling engine to generate the luminance-enhanced output image.

15. The image sensor of claim 13, wherein the upsampling engine is to upsample the L capture frame to generate the L guide frame by:

upscaling the L capture frame to generate an upscaled L frame having a target frame size defined by an output image schema of the luminance-enhanced output image, a portion of the frame populated based on known luminance values from the L capture frame; and upsampling the upscaled L frame to generate the L guide frame based on interpolating the known luminance values, such that the L guide frame has 100-percent density of luminance information.

16. The image sensor of claim 13, wherein the upsampling engine is to apply the luminance-guided interpolation to the RGB capture frame, for each color plane of the RGB capture frame, by:

upscaling the color plane to generate a respective upscaled color frame, such that the respective upscaled color frame has a target frame size defined by an output image schema of the luminance-enhanced output image, and a portion of the respective upscaled color frame is populated based on respective known color values from the color plane; and upsampling the respective upscaled color frame to generate a respective upsampled color frame by applying the luminance-guided interpolation to the respective known color values based on the L guide frame.

17. The image sensor of claim 16, wherein the output image schema further defines a target CFA pattern for the luminance-enhanced output image; and for each color plane of the RGB capture frame, the upsampling the respective upscaled color frame generates the respective upsampled color frame by using the luminance-guided interpolation to remosaic the respective known color values based on the L guide frame into the target CFA pattern.

18. The image sensor of claim 13, wherein:

the L guide frame comprises an array of L value cells, each having a respective luminance value; and the upsampling engine is to apply the luminance-guided interpolation to the RGB capture frame by generating an upsampled RGB frame to have an array of color value cells by, for each color value cell of a portion of the color value cells:

generating a respective initial value for the color value cell based on interpolating a respective neighboring set of known color values based on the RGB capture frame; and computing an estimated color pixel value for the color value cell by adjusting the respective initial value based on the luminance values of those of the L value cells spatially corresponding to the color value cell and to the locations of the respective neighboring set of known color values.

19. The image sensor of claim 13, wherein:

the image sensor array has a native resolution;

the RGB capture frame has a downsampled resolution that is less than or equal to one-fourth of the native resolution; and the luminance-enhanced output image has an output resolution that is at least three times the downsampled resolution.

20. The image sensor of claim 13, wherein the RGBL CFA pattern of the image sensor array has at least a 50-percent density of luminance imaging pixels.

* * * * *